(12) United States Patent
Suzuki

(10) Patent No.: US 8,267,836 B2
(45) Date of Patent: Sep. 18, 2012

(54) CONTROL SYSTEM FOR AUTOMATIC TRANSMISSION

(75) Inventor: Masami Suzuki, Mishima (JP)

(73) Assignee: JATCO Ltd, Fuji-shi (JP)

( * ) Notice: Subject to any disclaimer, the term of this patent is extended or adjusted under 35 U.S.C. 154(b) by 530 days.

(21) Appl. No.: 12/486,981

(22) Filed: Jun. 18, 2009

(65) Prior Publication Data

US 2009/0318264 A1 Dec. 24, 2009

(30) Foreign Application Priority Data

Jun. 23, 2008 (JP) .................................. 2008-163563

(51) Int. Cl.
| | |
|---|---|
| F16H 61/40 | (2010.01) |
| F16H 59/48 | (2006.01) |
| F16H 61/26 | (2006.01) |
| B60W 10/00 | (2006.01) |
| B60W 10/04 | (2006.01) |
| B60W 10/10 | (2012.01) |

(52) U.S. Cl. ............ 477/77; 477/68; 477/107; 477/120; 477/156

(58) Field of Classification Search ............... 477/77, 477/52, 68, 70, 71, 73, 74, 79, 107, 115, 477/120

See application file for complete search history.

(56) References Cited

U.S. PATENT DOCUMENTS

| 5,810,692 A * | 9/1998 | Takiguchi et al. ............ 477/144 |
| 6,068,576 A | 5/2000 | Tsutsui et al. |
| 7,089,102 B2 * | 8/2006 | Slayton et al. .................. 701/51 |
| 2011/0230308 A1 * | 9/2011 | Inoue et al. ..................... 477/54 |

FOREIGN PATENT DOCUMENTS

| JP | 3-194256 A | 8/1991 |
| JP | 2004-125075 A | 4/2004 |

* cited by examiner

*Primary Examiner* — Tisha Lewis
(74) *Attorney, Agent, or Firm* — Foley & Lardner LLP

(57) ABSTRACT

A control system for an automatic transmission includes a downshift control section configured to increase an engaging capacity of an engaging-side engaging element to engage the engaging-side engaging element and decrease a first engaging capacity of a disengaging-side engaging element to disengage the disengaging-side engaging element when a parameter representing a progressing condition of the downshift reaches a value, thereby carrying out the downshift in a power-on condition. Additionally, the downshift control section is configured to decrease the engaging capacity of the disengaging-side engaging element to a second engaging capacity smaller than the first engaging capacity to continue the downshift which is currently progressing and to cause the engine control section to continue controlling the engine speed when a power-off condition is detected upon an accelerator pedal being returned to a position representing an operating amount during the downshift.

4 Claims, 9 Drawing Sheets

FIG.2

| | B1<br>Fr/B | C1<br>I/C | C2<br>D/C | C3<br>H&RL<br>/C | B2<br>LOW/B | B3<br>2346/B | B4<br>R/B | F1 | F2 |
|---|---|---|---|---|---|---|---|---|---|
| 1st | (○) | | | (○) | ○ | | | ○ | ○ |
| 2nd | | | | (○) | ○ | ○ | | | ○ |
| 3rd | | | ○ | | ○ | ○ | | | |
| 4th | | | ○ | ○ | | ○ | | | |
| 5th | | ○ | ○ | ○ | | | | | |
| 6th | | ○ | | ○ | | ○ | | | |
| 7th | ○ | ○ | | ○ | | | | ○ | |
| Rev. | ○ | | | ○ | | | ○ | | |

CONTROL SYSTEM FOR AUTOMATIC TRANSMISSION

BACKGROUND OF THE INVENTION

This invention relates to a control system for a geared automatic transmission applicable for an automotive vehicle.

Hitherto a control system for an automatic transmission is disclosed in Japanese Patent Provisional Publication No. 3-194256 which teaches a technique for carrying out a shift by disengaging a disengaging-side friction engaging element and engaging an engaging-side friction engaging element. This technique is configured as follow: The engaging capacity of the disengaging-side engaging element is set at a certain value for establishing a slip condition, so that the engine speed is held at a value according to a gear ratio obtained after a downshift (hereinafter referred to as "synchronization control"). When this engine speed is reached, the disengaging-side engaging element is put into a disengaging state while the engaging capacity of the engaging-side engaging element is increased, thereby accomplishing a good downshift.

SUMMARY OF THE INVENTION

Here, there is a case where a decision of a downshift is made by depressing an accelerator pedal (hereinafter referred to as "power-on downshift", and the accelerator pedal is returned during the execution of the downshift. In this case, a target gear (shift gear stage) according to an accelerator pedal depression degree (operating amount) is changed to an upshift side; however, an operator often requires a deceleration. Accordingly, it is preferable to obtain a greater engine brake force by continuing the downshift currently in progress, from the viewpoint of positively using an engine brake.

Consequently, it is thought out to continue the downshift under such an operating condition; however, when the synchronization control of the engine is continued in a condition where a certain engaging capacity is kept at the disengaging-side engaging element like in the control system for the automatic transmission disclosed in Japanese Patent Provisional Publication No. 3-194256, a positive torque is output from the side of the engine and transmitted to drive wheels producing an acceleration feeling, thereby making a fear of providing an unreasonable feeling to the operator who requires a deceleration.

Accordingly, it will be thought that, when a power-off condition is detected, the control is changed to the following: The engine power output is controlled under a control (hereinafter referred to as "torque control") according to the accelerator pedal depression degree, and the disengaging-side engaging element is put into a disengaging state while the engaging-side element is put into an engaging state like in the normal power-on downshift control, thereby accomplishing a downshift upon raising the engine speed. In this case, since the positive torque is not transmitted from the side of the engine (the accelerator pedal is returned, and therefore the engine does not generate a torque sufficient to raise the engine speed), the acceleration feeling can be prevented from being generated.

However, in order to accomplish the above shift, it is required for controlling the engaging elements, that the engaging capacity control of the disengaging-side engaging element is changed to the engaging capacity control of the engaging-side engaging element, while the torque of the engine is lowered. Consequently, a shift shock will occur if changeovers are made at suitable timings on the engine torque, the disengaging state of the engaging element and the engaging state of the engaging element (i.e., three factors); however, the control itself is complicated if the three factors are changed over at the suitable timings.

It is an object of the present invention is to provide an improved control system for an automatic transmission, which can effectively overcome drawbacks encountered in conventional control systems of automatic transmissions of the similar kinds.

Another object of the present invention is to provide an improved control system for an automatic transmission, which can effectively prevent a shift shock from occurrence without providing an unreasonable feeling to an operator while preventing control itself from being complicated, even when an accelerator pedal is released during the execution of a power-on downshift of the automatic transmission.

According to the present invention, a control system for an automatic transmission is arranged such that a downshift is made by disengaging a disengaging-side engaging element and engaging an engaging-side engaging element. The control system comprises an engine control section for controlling an engine speed of an engine connected to the automatic transmission, a downshift control section, and a detecting section for detecting an operating amount of an accelerator pedal. The downshift control section is configured to provide a first engaging capacity to the disengaging-side engaging element and put the engaging-side engaging element in a disengaging state, and to control the engine control section to maintain the engine speed at a level according to a gear of the automatic transmission to be obtained after the downshift; and to increase an engaging capacity of the engaging-side engaging element to engage the engaging-side engaging element and decrease the engaging capacity of the disengaging-side engaging element to disengage the disengaging-side engaging element when a parameter representing a progressing condition of the downshift reaches a value, thereby carrying out a downshift in a power-on condition. In the above control system, the downshift control section is configured to decrease the engaging capacity of the disengaging-side engaging element to a second engaging capacity smaller than the first engaging capacity to continue the downshift which is currently progressing and to cause the engine control section to continue controlling the engine speed when a power-off condition is detected upon an accelerator pedal being returned to a position representing an operating amount during the downshift.

BRIEF DESCRIPTION OF THE DRAWINGS

In the drawings, like reference numerals designate like parts and elements throughout all figures, in which:

FIG. 2 is an engaging table showing engaging states of respective engaging elements at each shift gear stage, in the automatic transmission of FIG. 1;

DETAILED DESCRIPTION OF THE INVENTION

Figure 1:
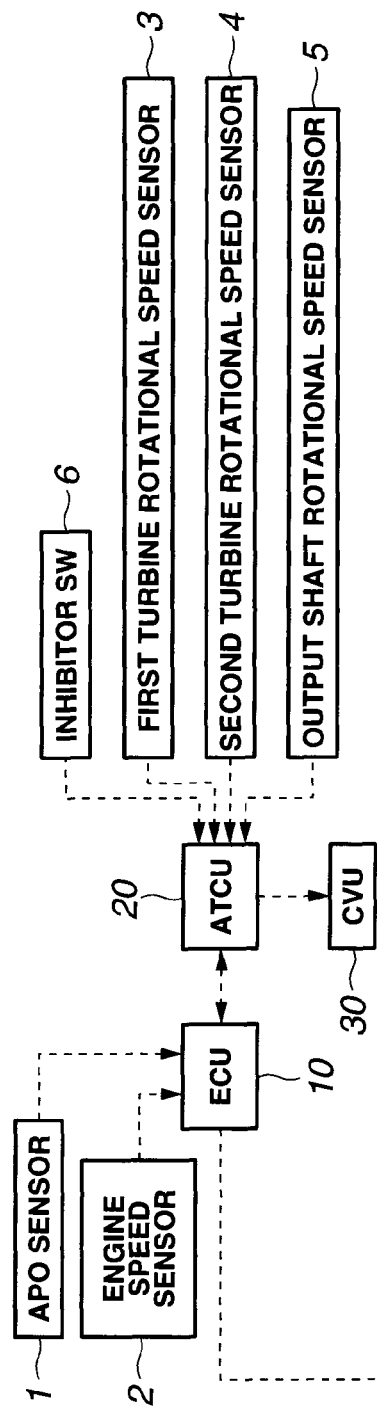
FIG. 1 is a skeletal view showing a configuration of an automatic transmission provided with a first embodiment of a control system for the automatic transmission, according to the present invention.
Figure 1:
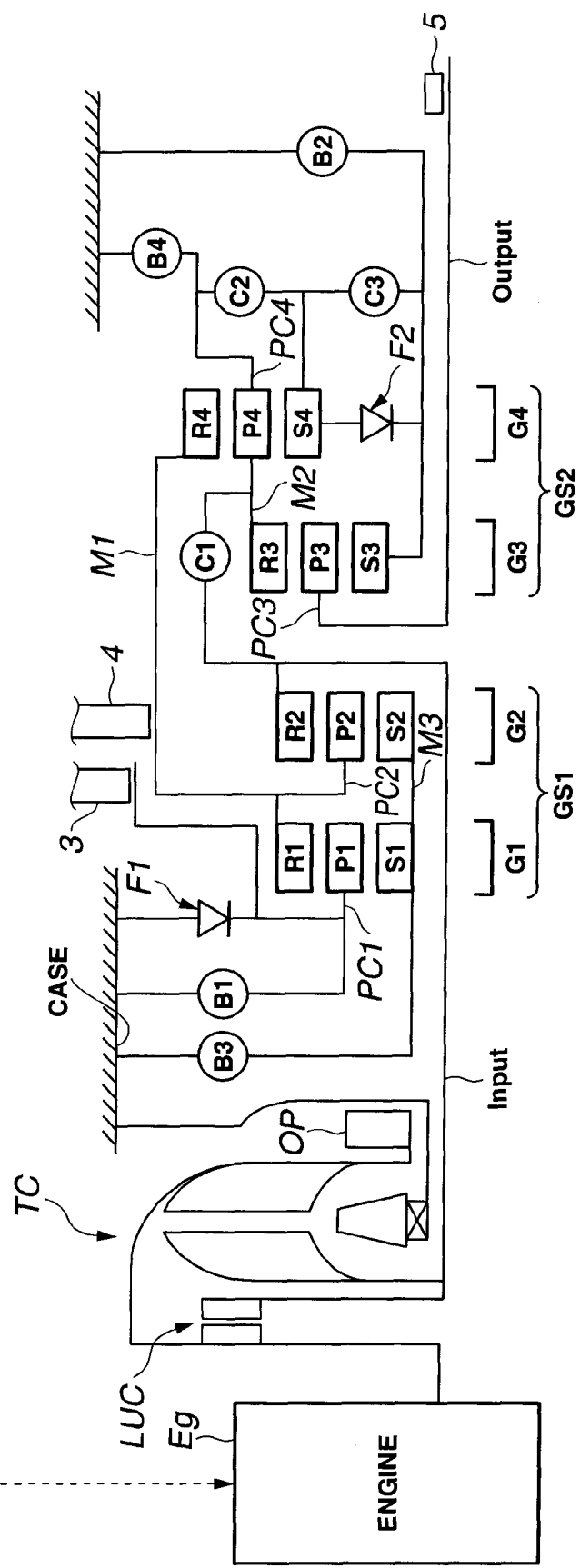

Referring now to FIG. 1 of the drawings, a geared automatic transmission of the seven forward speeds and one reverse speed type is illustrated including a first embodiment of a control system for an automatic transmission, according to the present invention. The automatic transmission is connected to an engine Eg. A driving force of the engine Eg is transmitted through a torque converter TC to an input shaft Input, and then input from the input shaft Input to four planetary gear sets and seven friction engaging elements by which a rotational speed of the input shaft Input is changed and output from an output shaft Output. An oil pump OP is disposed coaxial with a pump impeller of the torque converter TC so as to be driven to rotate under the driving force of the engine Eg thereby pressurizing oil.

The control system includes an engine controller or engine control unit (ECU) 10 which is connected to an automatic transmission controller or control unit (ATCU) 20 for controlling a shift condition and the like of the automatic transmission. The controller 20 is connected to a control valve unit (CVU) 30 for controlling the oil pressures of the respective engaging elements based on output signals from the ATCU 20. The CVU 30 serves as a continuous shift control means. The ECU 10 and the ATCU 20 are connected through a CAN communication line or the like so that they share sensor information (information of various sensors) and control information (information for various controls) with each other.

To the ECU 10, an APO sensor 1 and an engine speed sensor 2 are connected. The APO sensor 1 is adapted to detect an accelerator pedal depression degree or operating amount made under depression of an accelerator pedal by an operator or driver. The engine speed sensor 2 is adapted to detect an engine speed of the engine Eg. The ECU is configured to control a fuel injection amount to the engine Eg or a throttle opening degree of the engine Eg thereby controlling the engine speed and the engine torque.

To the ATCU 20, a first turbine rotational speed sensor 3, a second turbine rotational speed sensor 4, an output shaft rotational speed sensor 5 and an inhibitor switch 6 are connected. The first turbine rotational speed sensor 3 is adapted to detect a rotational speed of a first carrier PC1. The second turbine rotational speed sensor 4 is adapted to detect a rotational speed of a first ring gear R1. The output shaft rotational speed sensor 5 is adapted to detect a rotational speed of the output shaft Output. The inhibitor switch 6 is adapted to detect an operational state of a shift lever, made by the operator. The ATCU is configured to select an optimum command gear (shift gear stage) of the automatic transmission and output a control command for accomplishing the command gear, to the CVU 30.

Subsequently, a shift gear mechanism between the input shaft Input and the output shaft Output will be discussed.

In the automatic transmission, a first planetary gear set unit GS1 and a second planetary gear set unit GS2 are arranged side by side along an axial direction from the input shaft Input to the output shaft Output. The first planetary gear set unit GS1 includes a first planetary gear set G1 and a second planetary gear set G2. The second planetary gear set unit GS2 includes a third planetary gear set G3 and a fourth planetary gear set G4. Additionally, a plurality of clutches C1, C2 and C3 and a plurality of brakes B1, B2, B3 and B4 are disposed as the friction engaging elements, in connection with the planetary gear set units GS1, GS2. Further, a plurality of one-way clutches F1, F2 are disposed in connection with the planetary gear set units GS1, GS2.

The first planetary gear set G1 is a single pinion type planetary gear set and includes a first sun gear S1, a first ring gear R1, a first pinion P1 which is in mesh with the gears S1, R1, and a first carrier PC1 for supporting the first pinion P1. The second planetary gear set G2 is a single pinion type planetary gear set and includes a second sun gear S2, a second ring gear R2, a second pinion P2 which is in mesh with the gears S2, R2, and a second carrier PC2 for supporting the second pinion P2. The third planetary gear set G3 is a single pinion type planetary gear set and includes a third sun gear S3, a third ring gear R3, a third pinion P1 which is in mesh with the gears S3, R3, and a third carrier PC3 for supporting the third pinion P3. The fourth planetary gear set G4 is a single pinion type planetary gear set and includes a fourth sun gear S4, a fourth ring gear R4, a fourth pinion P4 which is in mesh with the gears S4, R4, and a fourth carrier PC4 for supporting the fourth pinion P4.

The input shaft Input is connected to the second ring gear R2 so that a rotational driving force from the engine Eg is input through the torque converter TC and the like to the second ring gear R2. The output shaft Output is connected to the third carried PC3 so that the output rotational driving force is transmitted through a final gear and the like to driving wheels.

A first connecting member M1 is a member for connecting the first ring gear R1, the second carrier PC2 and the fourth ring gear R4 as one body. A second connecting member M2 is a member for connecting the third ring gear R3 and the fourth carrier PC4 as one body. A third connecting member is a member for connecting the first sun gear S1 and the second sun gear S2 as one body.

In the first planetary gear unit GS1, the first planetary gear set G1 and the second planetary gear set G2 are connected with each other by the first connecting member M1 and the third connecting member M3, so that the first planetary gear unit GS1 is constituted of four rotational elements. In the second planetary gear unit GS2, the third planetary gear set G3 and the fourth planetary gear set G4 are connected with each other by the second connecting member M2, so that the second planetary gear unit GS2 is constituted of five rotational elements.

In the first planetary gear unit GS1, a torque is input from the input shaft Input to the second ring gear R2, and the input torque is output through the first connecting member M1 to the second planetary gear unit GS2. In the second planetary gear unit GS2, the torque is input from the input shaft Input directly to the second connecting member M2 while the torque is input through the first connecting member M1 to the fourth ring gear R4, the input torque being output from the third carrier PC3 to the output shaft Output.

The input clutch C1 is a clutch for selectively connecting or disconnecting the input shaft Input and the second connecting member M2. The direct clutch C2 is a clutch for selectively connecting or disconnecting the fourth sun gear S4 and the fourth carrier PC4.

The H&LR clutch C3 is a clutch for selectively connecting or disconnecting the third sun gear S3 and the fourth sun gear S4. The second one-way clutch F2 is disposed between the third sun gear S3 and the fourth sun gear S4. With this, when the H&LR clutch C3 is disengaged while the fourth sun gear S4 is higher in rotational speed than the third sun gear S3, the third sun gear S3 and the fourth sun gear S4 develop respectively rotational speeds independent from each other. Accordingly, the third planetary gear set G3 and the fourth planetary gear set G4 are connected through the second connecting member M2, so that the respective planetary gear sets accomplish gear ratios independent from each other.

The front brake B1 is a brake for selectively stopping the rotation of the first carrier PC1. The first one-way clutch F1 is disposed parallel with the front brake B1. The low brake B2 is a brake for selectively stopping the rotation of the third sun gear S3. The 2346 brake B3 is a brake for selectively stopping the rotation of the third connecting member M3 for connecting the first sun gear S1 and the second sun gear S2. The reverse brake B4 is a brake for selectively stopping the rotation of the fourth carrier PC4.

The shift gear mechanism is configured as discussed above and can realize desired gears (shift gear stages) of the automatic transmission by changing over the engaging states of the respective engaging elements as shown in an engagement table of FIG. 2. In the engagement table of FIG. 2, a mark "◯" indicates that the engaging element is put into an engaging state; and a mark "(◯)" indicates that the engaging element is put into an engaging state when a range position for applying an engine brake is selected.

Specifically, in first gear of the automatic transmission, only low brake B2 is put into the engaging state, by which each of the first one-way clutch F1 and the second one-way clutch F2 is engaged. In second gear of the automatic transmission, each of the low brake B2 and the 2346 brake B3 is put into the engaging state, and the second one-way clutch F2 is engaged. In third gear of the automatic transmission, each of the low brake B2, the 2346 brake B3 and the direct clutch C2 is put into the engaging state, and each of the first one-way clutch F1 and the second one-way clutch F2 is not engaged. In fourth gear of the automatic transmission, each of the 2346 brake B3, the direct clutch C2 and H&LR clutch C3 is put into the engaging state. In fifth gear of the automatic transmission, each of the input clutch C1, the direct clutch C2 and H&LR clutch C3 is put into the engaging state. In sixth gear of the automatic transmission, each of the 2346 brake B3, the input clutch C1 and the H&LR clutch C3 is put into the engaging state. In seventh gear of the automatic transmission, each of the front brake B1, the input clutch C1 and the H&LR clutch C3 is put into the engaging state, and the first one-way clutch F1 is engaged. In reverse gear, each of the reverse brake B4, the front brake B1 and the H&LR clutch C3 is put into the engaging state.

Figure 3:
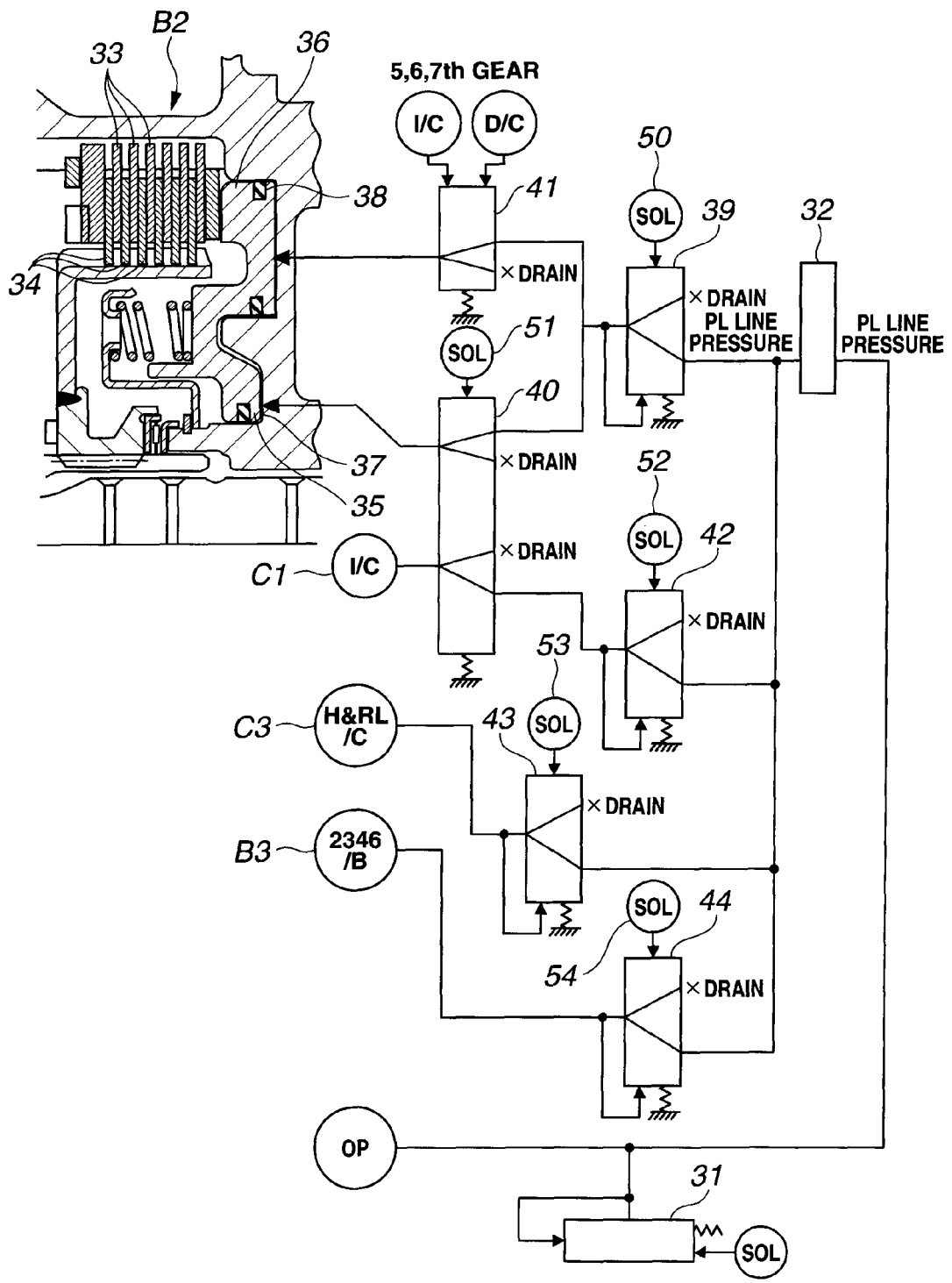
FIG. 3 is a circuit diagram showing a hydraulic (oil pressure) circuit of a control valve unit (CVU) in the control system of FIG. 1.

FIG. 3 is a circuit diagram showing a hydraulic (oil pressure) circuit of the control valve unit (CVU) 30. Here, discussion will be made mainly on a hydraulic circuit for supplying oil pressure to the low brake B2, the input clutch C1, the H&LR clutch C3 and the 2346 brake B3.

The CVU 30 includes an oil pump OP, a pressure regulator valve 31 for regulating a line pressure, and a manual valve 32 for changing over an oil pressure supply passage, in which a discharge pressure of the oil pump OP is regulated according to the opening degree of a drain port of the pressure regulator valve 31 thereby producing a line pressure. The line pressure is supplied to each of the engaging elements through the oil pressure supply passage which is changed over by a manual valve 32.

The low brake B2 is frictionally engaged upon its first friction plate 33 and its second friction plate 34 being in press contact with each other under biasing forces of first and second pistons 35, 36. The first and second pistons 35, 36 are formed integral with each other and have respectively relatively small and large pressure receiving areas. With this, independent pressures are respectively supplied to a first oil pressure chamber 37 for applying oil pressure to the first piston 35 and a second oil pressure chamber 38 for applying oil pressure to the second piston 36, in which a sum of a first product of the oil pressure applied to and the pressure receiving area of the first piston 35 and a second product of the oil pressure applied to and the pressure receiving area of the second piston 36 acts as a biasing for the whole piston including the first and second pistons 35, 36 and is referred to as an engaging capacity of the low brake B2.

A hydraulic circuit for the low brake B2 includes a pressure regulator valve 39 for regulating oil pressure supplied to the low brake B2, a first changeover valve 40 for opening and closing the oil pressure supply passage leading to the first oil pressure chamber 37, and a second changeover valve 41 for opening and closing the oil pressure supply passage leading to the second oil pressure chamber 38.

In the pressure regulator valve 39, a valve opening degree is controlled according to an operating amount of a linear solenoid 50. A regulator valve 39 is changed over in its position by a ON/OFF solenoid 51 serving as a signal pressure and takes a first position at which a communication state is established between the pressure regulator valve 39 and the first oil pressure chamber 37 while a communication state is established between the oil pressure chamber of the input clutch C1 and a drain port, and a second position at which a non-communication state is established between the regulator valve 39 and the oil pressure chamber 37 and a communication state is established between the first oil pressure chamber 37 and the drain port while a communication state is established between the oil pressure chamber of the input clutch C1 and the pressure regulator valve 41. The solenoid 51 is controlled to be switched OFF during development of oil pressure in the input clutch C1 (i.e., when an oil pressure command is produced) and switched ON when the oil pressure command of the input clutch C1 is zero.

A second changeover valve 41 is changed over in its position by signal pressures which are the oil pressure supplied to the input clutch C1 and the oil pressure supplied to the direct clutch C2, and takes a first position for establishing a communication state when the oil pressure is not supplied to the input clutch C1 and the direct clutch C2 and a second position for establishing a non-communication state when oil pressure is supplied to the input clutch C1 or the direction clutch C2.

Similarly, the hydraulic circuit for the input clutch C1, H&LR clutch C3 and the 2346 brake B3 respectively include regulator valves 42, 43, 44 for respectively regulating oil pressures supplied to the respective engaging elements, and linear solenoids 52, 53, 54 for respectively controlling the valve opening degrees of the respective regulator valves.

The line pressure supplied through the manual valve 32 to the hydraulic circuit for the low brake B2 is regulated by the regulator valve 39 to serve as a low brake operating oil pressure. The low brake operating oil pressure is not supplied to the manual valve 32 when both of the first changeover valve 40 and the second changeover valve 41 take the second position, and is supplied to the first oil pressure chamber 37 and the second oil pressure chamber 38 through the changeover valve taking the first position when one of the first and second changeover valves 40, 41 takes the first position. Additionally, the low brake operating oil pressure is supplied to the first and second oil pressure chambers 37, 38 when both of the first and second changeover valves 40, 41 take the first position.

As shown in the engaging table of FIG. 2, the low brake B2 is engaged only in first to third gears. In these gears, a torque ratio (allotted torque) is large in first and second gears, and therefore a large engaging capacity is required between the first and second friction plates 33, 34, so that both of the first and second changeover valves 40, 41 take the first position. In third gear, the torque ratio is relatively small, and therefore a large engaging capacity is not required between the first and second friction plates, so that only the first changeover valve 40 takes the first position whereas the second changeover valve 41 takes the second position.

In such an automatic transmission, on the assumption that the input clutch C1 and the low brake B2 are simultaneously engaged, for example, during the shift from forth gear to third gear, interlocking or the like will occur so that abrupt deceleration G is generated in a vehicle. Accordingly, a simultaneous engagement of the input clutch C1 and the low brake B2 is prevented by the first and second changeover valves 40, 41.

[Normal Downshift Control Processing]

Figure 4:
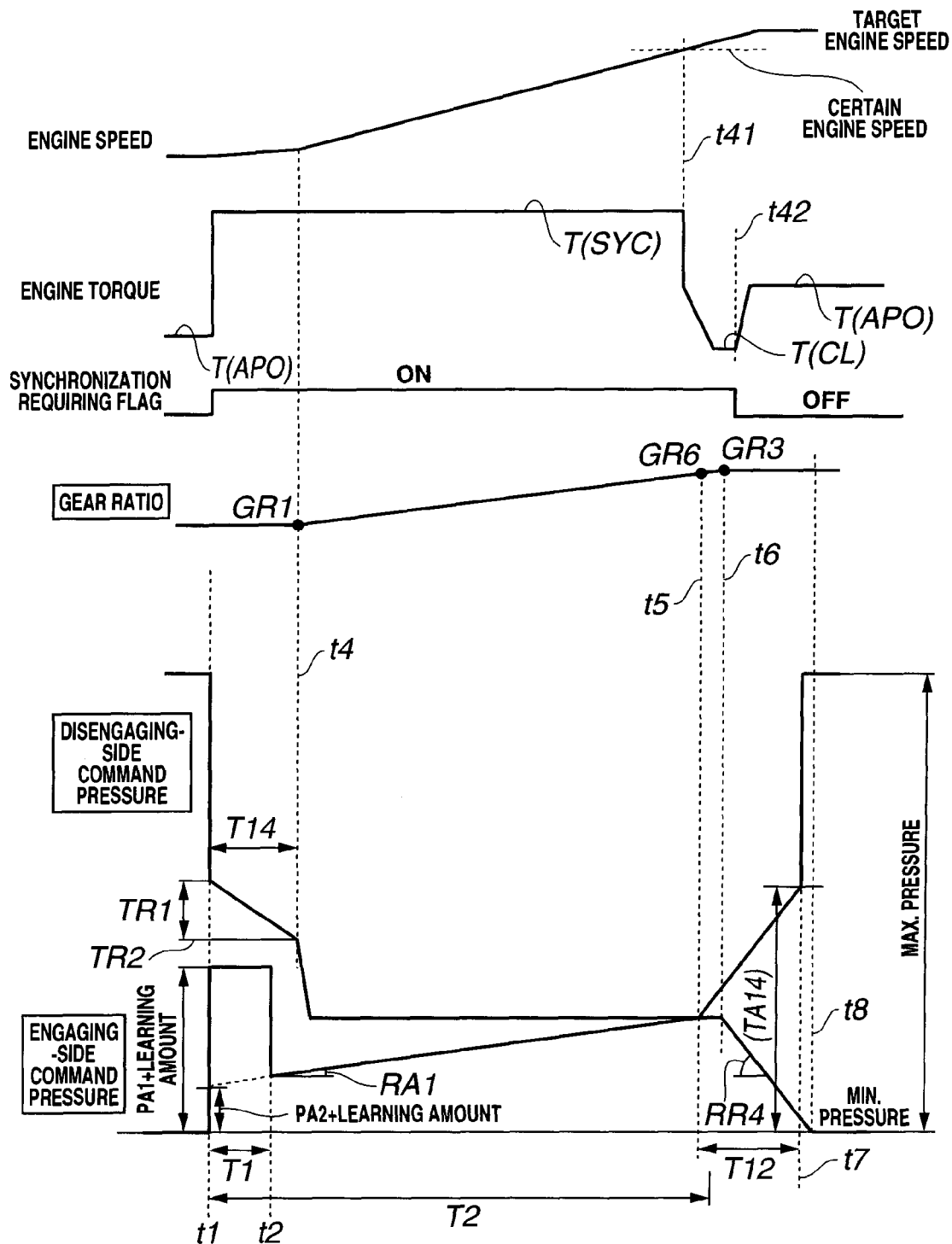
FIG. 4 is a time chart for explaining a normal power-on downshift carried out by the control system of FIG. 1.
Figure 5:
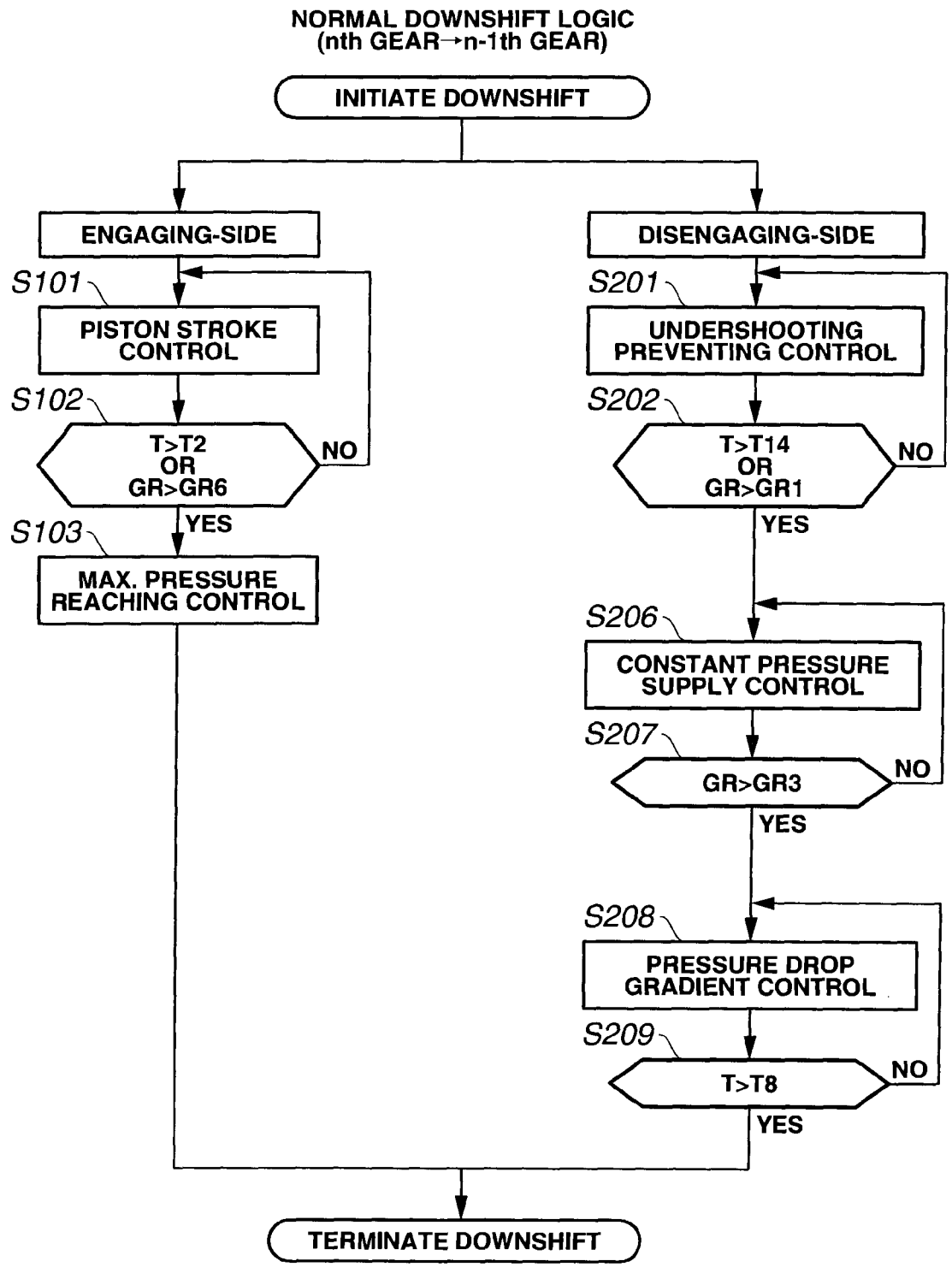
FIG. 5 is a flowchart showing a control for engaging elements during the normal power-on downshift of FIG. 4.
Figure 6:
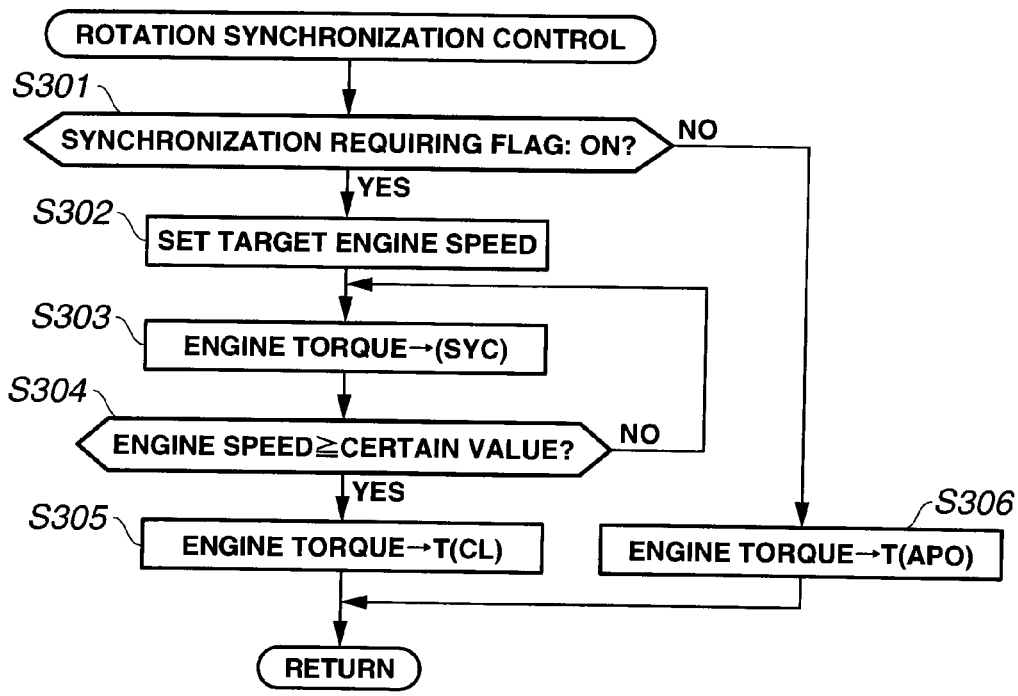
FIG. 6 is a flowchart showing a rotation synchronization control of the engine during the normal power-on downshift of FIG. 4.

Next, a downshift by depressing the accelerator pedal (hereinafter referred to as a power-on downshift) will be discussed with reference to FIGS. 4, 5 and 6. FIG. 4 is a time chart for explaining the normal power-on downshift. FIG. 5 is a flowchart showing a control for the engaging elements during the power-on downshift (hereinafter referred to as a shift control). FIG. 6 is a flowchart showing a rotation synchronization control of the engine during the power-on downshift.

When a running condition of the vehicle is changed during running in nth gear so that a target gear (shift gear stage) NextGP is set at n-1th gear according to a shift map in the ATCU 20, a current gear CurGP and the target gear disagree with each other. With this disagreement, a decision that a requirement of a shift arises is made, so that the downshift from the nth gear (the current gear CurGP) to the n-1th gear is initiated based on a control signal.

Figure 7:
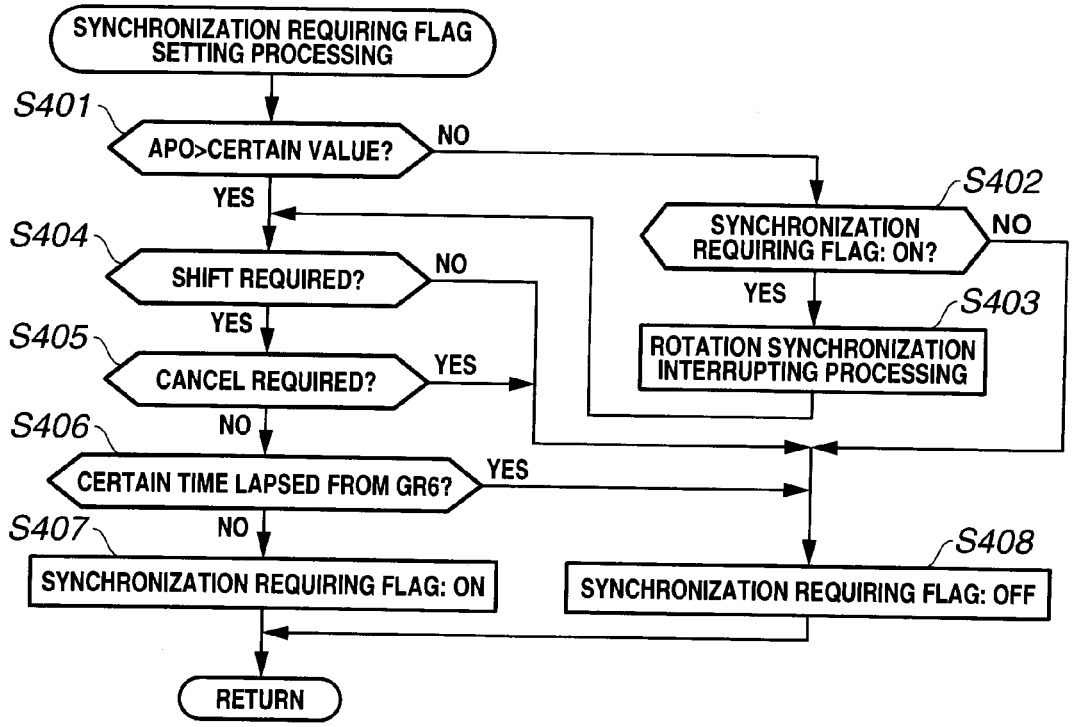
FIG. 7 is a flowchart showing a synchronization requiring flag setting processing carried out by the control system of FIG. 1.

At this time, as shown in a flowchart of FIG. 7, a synchronization requiring flag is switched ON (see step S407) when the change rate of the accelerator pedal depression degree (operating amount) is larger than a certain change rate or value (see step S401); a requirement for the shift is output from the ATCU 20 (see step S404); and a cancel requirement does not arise (see step S405). The cancel requirement is a requirement for interrupting the rotation synchronization control, for example, in case that the accelerator pedal depression degree is changed during the shift control, which will be later discussed in detail.

On the side of the engine, when the ECU 10 receives a signal of a synchronization requiring flag ON (being switched ON) from the side of the ATCU 20 (see step S301), the rotation synchronization control is initiated. While the synchronization requiring flag ON signal serves as a trigger for initiating the rotation synchronization control in the first embodiment, it will be understood that, otherwise, the rotation synchronization control may be initiated when the accelerator pedal depression degree is a certain value or larger.

In the rotation synchronization control as shown in FIG. 6, first the information of the current vehicle speed and the target gear is received from the side of the ATCU 20. Then, based on this information, a target engine speed corresponding to the gear (shift gear stage) after the shift is set (see step S302). Then, an engine torque is changed from the engine torque (APO) according to the accelerator pedal depression degree set during a normal control upon raising the engine speed to the target engine speed, and set at a synchronization torque T (SYC) which is for raising the engine speed to the target engine speed and is preset to be larger than the value of the engaging capacity of the disengaging-side friction element (see step S303).

When the downshift is initiated, a piston stroke control for the piston of each clutch is carried out with the initiation of the shift in the engaging-side engaging element (see time t1 to time t5 in FIG. 4). This piston stroke control is accomplished by a first oil pressure value outputting means for outputting a first oil pressure value or relatively low oil pressure command (or command pressure) and a second oil pressure value outputting means for outputting a second oil pressure value or relatively high oil pressure command (or command pressure).

The first oil pressure value outputting means and the second oil pressure value outputting means make their calculations independently from each other, upon which a higher one of the first and second oil pressure values is output, as a final command, to the solenoid (such as the solenoid 51 in FIG. 3) for controlling the operating oil pressure of each clutch. During a normal shift, the outputting from the first and second oil pressure value outputting means is initiated with the command for shifting. Then, until a certain time T1 (discussed after) lapses, the oil pressure value from the second oil pressure value outputting means is output to the solenoid for regulating the operating oil pressure of the engaging-side clutch. After lapse of the certain time T1, only the oil pressure value from the first oil pressure outputting means is output to the solenoid.

The second oil pressure value outputting means accomplishes a control for completing a piston stroke as quickly as possible and is adapted to output, only for the certain time T1, such a high oil pressure value as to move the piston by a distance corresponding to about 70% of a whole piston stroke. The high oil pressure value at this time is output as a preset value PA1+a learning amount, in which the learning amount is corrected according to a time lapsed before reaching inertia phase and a change rate of the rotational speed of the input shaft, at any time.

When the oil pressure value (PA2+learning amount) from the first oil pressure value outputting means is output from the time t1 and the certain time T1 lapses reaching a time t2, the oil pressure value from the first oil pressure value outputting means is output to the solenoid. In other words, the oil pressure command value of PA1+learning amount is output until the time t2 and once lowered at the time t2. After outputting such a high oil pressure command value, the piston stroke gently progresses while a low oil pressure command value which has a certain inclination RA1 and is sufficient low to be able to be maintained is set for engagement of the engaging element. As discussed above, the calculation of the oil pressure command value by the first oil pressure value outputting means is initiated with the certain inclination RA1 using PA2+learning amount as an initial value, after the shift initiation at the time t1.

In this case, the certain inclination RA1 is set taking account of the rising state of actual oil pressure after termination of the piston stroke control and the dispersion of the piston stroke. In case of the power-on downshift, the progression of the shift control is made by the disengaging-side engaging element under the rotation synchronization control of the engine as discussed after. In case of the power-off downshift, the progression of the shift control is made by the engaging-side engaging element. Accordingly, the certain inclination RA1 is set gentler in the power-on downshift than in the power-off downshift.

With such an oil pressure command value, the piston of the engaging-side engaging element gradually makes its stroke, upon which the piston stroke control is terminated when the certain time T2 lapses or when the gear ratio reaches a certain gear ratio which is higher than a gear ratio GR1 at which the inertia phase is initiated and lower than a gear ratio GR6 at which the inertia phase is terminated.

In the disengaging-side engaging element, first an undershooting preventing control (see step S201 in FIG. 5) is carried out. In other words, when the downshift is initiated, the oil pressure command value (or is lowered to a certain oil pressure command value TR2 set according to an input torque in the disengaging-side engaging element. At this time, in order to prevent an excessive lowering (or undershooting) of the oil pressure from occurrence, an oil pressure command value slightly higher than the target oil pressure command value TR2 is output, and thereafter the oil pressure command value is gradually lowered to the oil pressure command value TR2 serving as a target value, taking a certain time t14 (see step S201 in FIG. 5).

The above oil pressure command value TR2 is an oil pressure for initiating the inertia phase and generally corresponds to an oil pressure at which the clutch of the disengaging-side engaging element starts to make a slight slip, during the power-on downshift. The oil pressure command value TR2 generally corresponds to an oil pressure at which the clutch of the disengaging-side engaging element does not make its slip, during the power-off downshift.

When the initiation of the inertia phase is detected or when the certain time T14 lapses (see step S202 in FIG. 5), a constant pressure supply control for providing a preset constant engaging capacity is carried out regardless of the change rate of the accelerator pedal depression degree (see step S206). In other words, the driving force from the engine is transmitted to the output shaft so as to suppress a stall feeling upon the engaging capacity of the disengaging-side engaging element being made constant, while the rotation synchronization control is carried out on the side of the engine so as to raise the engine speed to the target engine speed thereby making the progression of the inertia phase.

When the engine speed reaches a certain engine speed lower than the target engine speed at a time t14, the engine torque is gradually reduced to avoid an overshooting of the engine speed (a condition where the engine speed is raised over the target engine speed) while the engine torque is set at a clutch corresponding torque T(CL) at which the target engine speed can be maintained (see steps S304 and S305). This clutch corresponding torque T(CL) is a value corresponding to the engaging capacity of the disengaging-side engaging element and serves to maintain an output torque to the side of the driving wheels while maintaining the engine speed at the target engine speed.

Further, when the gear ratio GR reaches a certain gear ratio GR6, count-up of a timer is initiated, in which a synchronization requiring flag (or a flag for requiring the rotation synchronization control) is switched OFF at a time t42 which is reached upon lapse of a certain time from the time at which the gear ratio GR6 is reached (see step S408). With this, in the rotation synchronization control, the engine torque is changed from the clutch corresponding torque T(CL) to a torque T(APO) according to the accelerator pedal depression degree (see steps S301, S306). In other words, the engine torque is set at the torque T(APO) according to the accelerator pedal depression degree before the completion of the shift, thereby providing a forceful acceleration feeling to the operator.

When the gear ratio GR reaches a certain gear ratio GR3 near the gear ratio in the n-1th gear at a time t6, the constant pressure supply control is terminated (see step S207).

Additionally, in the engaging-side engaging element, when the gear ratio reaches the certain gear ratio GR6 which is set before the certain gear ratio GR3 (or when a time t2 lapses under operation of a backup timer) at a time t5, the piston stroke control is terminated (see step S102). Until the above time, the piston stroke control is continued.

Thereafter, in the engaging-side engaging element, a MAX. pressure reaching control is carried out (see step S103). In this MAX. pressure reaching control, the oil pressure is raised to a certain oil pressure TA14 spending a preset certain time T12. Here, the certain oil pressure TA14 is an oil pressure which securely accomplishes the nth gear and can prevent a shift shock due to dispersion of detection of the inertia phase termination.

When a certain time T12 lapses at a time t7, the oil pressure command value (duty) is set at 100% so as to output the maximum oil pressure (MAX. pressure) thereby to terminate the shift of the engaging-side engaging element. In the disengaging-side engaging element, when the constant pressure supply control is terminated, a pressure drop gradient control is carried out (see step S208). In this pressure drop gradient control, when the termination of the inertia phase is detected at the time t6, the oil pressure is lowered with a certain inclination RR4 according to the input torque and quickly controlled to the minimum oil pressure (or zero oil pressure) suppressing a torque fluctuation of the output shaft (see step S208).

When a certain time T8 lapses after the oil pressure lowering with the certain inclination RR4 at a time t8, the oil pressure command value (duty) is set at 0% so as to output the minimum oil pressure (MIN. pressure=zero oil pressure) thereby terminating the control of the disengaging-side engaging element. By this, the shift is completed so that the current gear (shift gear stage) CurGP is changed from the gear (nth gear) employed before the shift to the gear (n-1th gear) accomplished after the shift.

As discussed above, the downshift in the normal shift is carried out.

[Foot-Releasing Control Processing During Power-On Downshift]

Next, discussion will be made on a rotation synchronization control interrupting processing which is carried out in case that an accelerator pedal is returned during execution of the rotation synchronization control in the power-on downshift. FIG. 7 is a flowchart for making a decision as to whether the shift control (see FIG. 5) and the rotation synchronization control (see FIG. 6) are to be continued or not according to the accelerator pedal depression degree. The rotation synchronization control interrupting processing is shown in a flowchart of FIG. 8.

Figure 11:
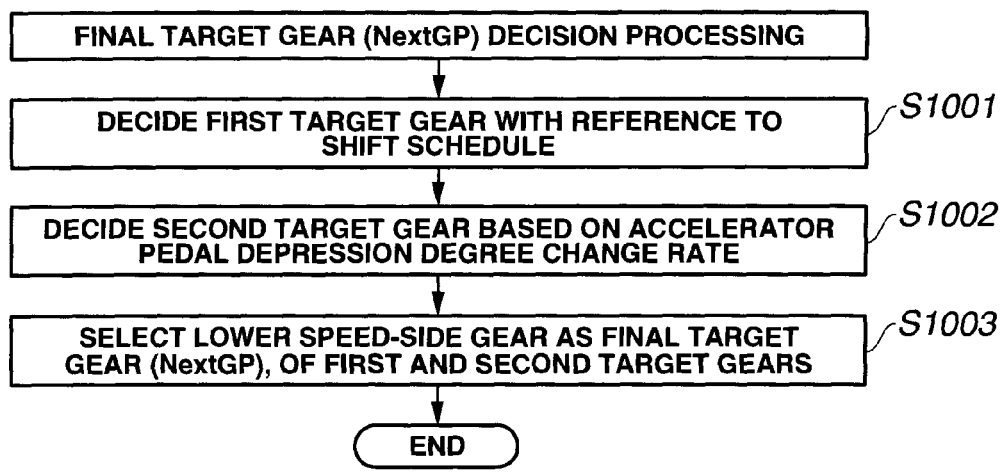
FIG. 11 is a flowchart showing a processing for deciding a final target shift gear stage, carried out by the control system of FIG. 1.

In the flowcharts, CurGP represents a current gear (shift gear stage). NextGP represents a final target gear (shift gear stage) which is a lower speed-side gear (shift gear stage) selected (see step S1003 in FIG. 11) from a gear (shift gear stage) decided with reference to a shift schedule in which gears (shift gear stages) are set according to the vehicle speed and the accelerator pedal depression degree (see step S1001) and another gear (shift gear stage) decided based on the change rate of the accelerator pedal depression degree obtained when the accelerator pedal is returned (see step S1002).

At the step S1002, the decided gear (shift gear stage) becomes lower relative to the current gear CurGP as the accelerator pedal depression degree obtained when the accelerator pedal is returned becomes larger. Additionally, SftGP represents the target gear in the shift control which is currently progressing, and represents a gear (shift gear stage) which is passed through during a skip shift, as discussed hereinafter. For example, in case that a shift is decided from 5th gear to 3rd gear, first a shift from the 5th gear to 4th gear is initiated. At this time, the CurGp is the 5th gear, the NextGP is the 3rd gear, and the SftGP is the 4th gear. When the shift of from the 5th gear to the 4th gear is completed and the inertia phase in the shift of from the 4th gear to the 3rd gear is initiated, the CurGP is the 4th gear, the NextGP is the 3rd gear, and the SftGP is the 3rd gear.

The kind of the shift carried out is decided based on a map whose ordinate expresses the CurGP and abscissa expresses the NextGP. For example, in case that the CurGP is 7th gear and the NextGP is 3rd gear, the shift kind of 7th gear→6th gear is set at a region corresponding to this relationship. When the shift of 7th gear→6th gear is terminated, the CurGP is the 6th gear and the NextGP is the 3rd gear so that the shift kind of 6th gear→5th gear is set at a region corresponding to this relationship.

Figure 8:
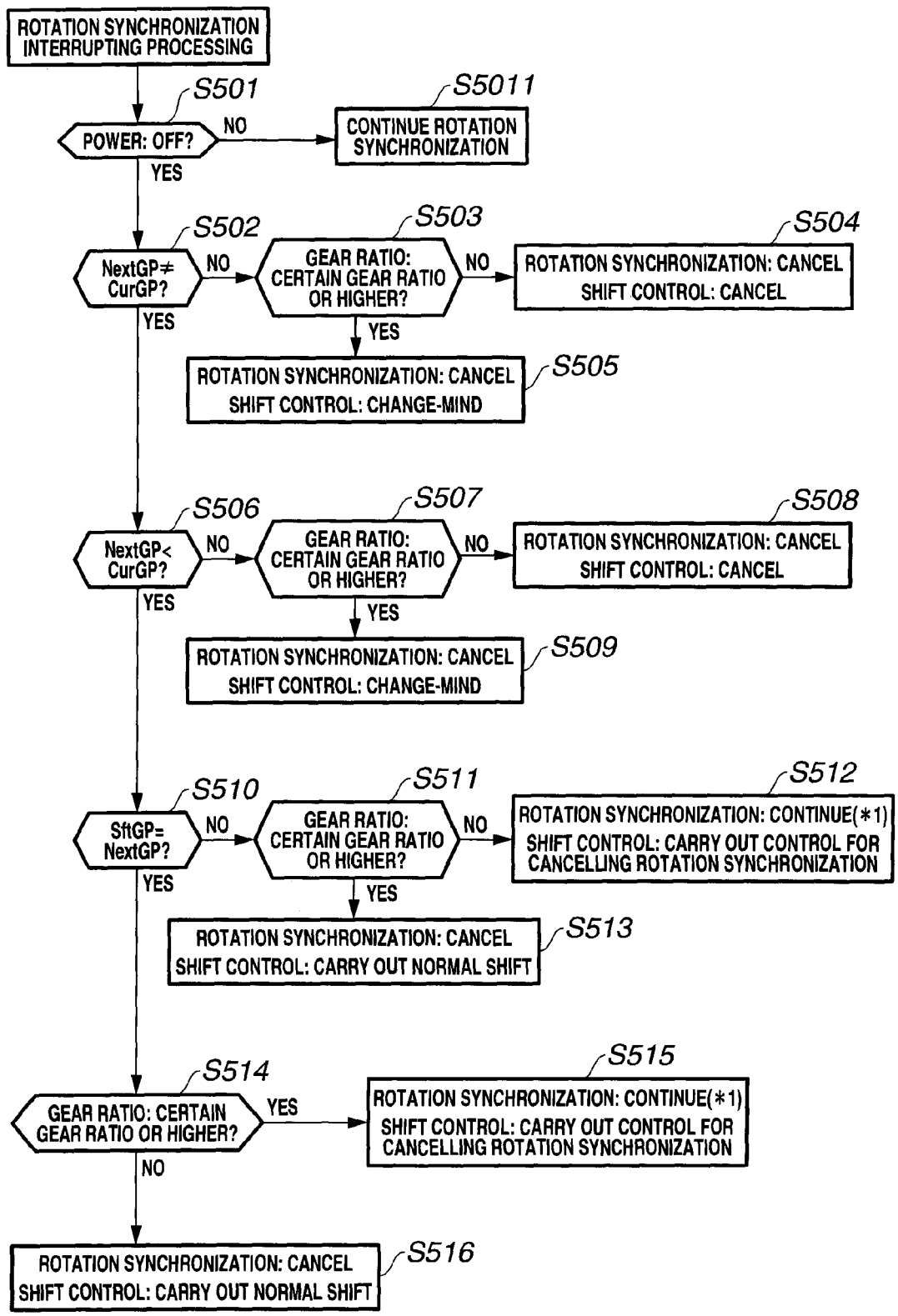
FIG. 8 is a flowchart showing a rotation synchronization interrupting processing carried out by the control system of FIG. 1.

At a step S501 in FIG. 8, a decision is made as to whether or not the accelerator pedal depression degree becomes smaller than a certain value, i.e., a power-off condition where the operator's foot is released from the accelerator pedal is established. When the power-off condition is detected, the processing goes to a step S502. When another condition is detected, the processing goes to a step S5011 at which the rotation synchronization control of the engine and the downshift control which are currently progressing are continued.

At a step S502, a decision is made as to whether or not the target gear NextGP and the current gear CurGP agree with each other as a result of the power-off condition established. When an agreement is made between the NextGP and the CurGp, a decision is made such that a change is made from the target gear NextGP set at the initiation of the shift control to the gear CurGP after the initiation of the shift, the gear CurGP being employed before the shift. Then, the processing goes to a step S503. If the agreement is not made, the processing goes to a step S506.

At the step S503, a decision is made as to whether or not the current condition is after the initiation of the inertia phase. In other words, here, a decision is made as to whether or not an actual gear ratio GP is a certain gear ratio or larger from the gear ratio of the current gear (shift gear stage). When the actual gear ratio is the certain gear ratio or larger (or after the initiation of the inertia phase), the processing goes to a step S505 at which a requirement for cancelling the rotation synchronization control of the engine is output while the target gear is changed to the current gear CurGP (hereinafter referred to as change-mind) as the shift control. The above certain gear ratio is a value which indicates a condition where the shift progresses by about 2% from the gear ratio GR1 representing the initiation of the inertia phase, and therefore the certain gear ratio represents a condition where the inertia phase hardly progresses. The above processing means a going-backward as the shift, in which the engaging-side engaging element under an engaging control (a control for engaging the engaging element) is changed to be under a disengaging control (a control for disengaging the engaging element) while the disengaging-side engaging element under the disengaging control is changed to be under the engaging control.

When the actual gear ratio is lower than the certain gear ratio from the gear ratio of the current gear, the inertia phase hardly progresses, so that both the present rotation synchronization control of the engine and the downshift control are cancelled. Because there arises no problem if such cancellation is immediately made when an actual shift has not been yet initiated.

At the step S506, as a result of the power-off condition established, a decision is made as to whether or not the final target gear NextGP is lower (in shift gear stage) than the current gear CurGP. When the decision result is such that the final target gear is lower than the current gear, the processing goes to a step S510. If the decision result is such that the final target gear is higher than the current gear, the processing goes to a step S507. For example, in case that the target gear is changed to the 6th gear after the initiation of the downshift of from the 5th gear to the 4th gear, the processing goes to the step S507.

At the step S507, a decision is made as to whether or not the current condition is after the initiation of the inertia phase. Specifically, a decision is made as to whether or not the actual gear ratio GP is the certain ratio or higher from the current gear (shift gear stage). When the actual gear ratio is the certain gear ratio or higher, the processing goes to a step S509 at which the requirement for cancelling the rotation synchronization control of the engine is output while the change-mind is carried out as the shift control. For example, although the shift of from the 5th gear to the 4th gear is intended to be made, the gear (shift gear stage) is returned to the 5th gear in the course of the shift to the 4th gear. When the actual gear ratio is lower than the certain gear ratio, the processing goes to a step S508 at which both the rotation synchronization control of the engine and the downshift control are cancelled, like in a step S504.

At a step S510, a decision is made as to whether or not the target gear SftGP in the downshift control which is currently progressing agrees to the final target gear NextGP. When an agreement is made between them, the processing goes to a step S514. When a disagreement is made between them, the processing goes to a step S511. For example, when the final target gear NextGP is maintained in the 3rd gear or changed to the 2nd gear by an power-off operation during the execution of the downshift of from the current gear 5th gear to the final target gear (the 3rd gear) setting the 4th gear as the current target gear SftGP, the processing goes to a step S514. When the final target gear NextGP is changed to the 4th gear during the execution of the same downshift, the processing goes to a step S514.

At the step S511, a decision is made as to whether or not the current condition is after the initiation of the inertia phase. Specifically, a decision is made as to whether or not the actual gear ratio GP is the certain ratio or higher from the current gear (shift gear stage). When the actual gear ratio is the certain gear ratio or higher, the processing goes to a step S512. When the actual gear ratio is lower than the certain gear ratio, the processing goes to a step S513.

At the step S512, the rotation synchronization control of the engine is continued as it is, while a control for cancelling the rotation synchronization control is carried out as the shift control. Here, (*1) in FIG. 8 represents suitably changing the target engine speed in the rotation synchronization control of the engine. In other words, when the rotation synchronization control is continued, the target engine speed in the rotation synchronization control is set based on the target gear NextGP at the initiation of the rotation synchronization control. At this time, in case that the target gear NextGP is changed (to the 2nd gear in the above example), a change is again made from the target engine speed corresponding to the 3rd gear to the target engine speed corresponding to the 2nd gear. The above-mentioned control for cancelling the rotation synchronization control will be discussed after.

At the step S513, since the inertia phase has not yet been initiated, a requirement for cancelling the rotation synchronization control is output while the normal shift control is carried out. For example, the normal shift control in case that the target gear NextGP is changed from the 3rd gear to the 2nd gear means carrying out a power-off downshift of from the 5th gear to the 2nd gear (i.e., a control for raising the engine speed under the action of the engaging-side engaging element).

At the step S514, a decision is made as to whether or not the current condition is after the initiation of the inertia phase. Specifically, a decision is made as to whether or not the actual gear ratio GP is the certain ratio or higher from the current gear (shift gear stage). When the actual gear ratio is the certain gear ratio or higher, the processing goes to a step S515. When the actual gear ratio is by lower than the certain gear ratio, the processing goes to a step S516.

At the step S515, the rotation synchronization control of the engine is continued while the rotation synchronization control cancelling control is carried out as the shift control. This means the following: In case that the final gear NextGP is changed from the 3rd gear to the 4th gear in the course of execution of the shift of from 5th gear to the 4th gear during the power-on downshift of from the 5th gear to the 3rd gear, the downshift to the 4th gear is immediately continued. Also at this time, the target engine speed is changed from that corresponding to the 3rd gear to that corresponding to the 2nd gear as represented by (*1).

At the step S516, the inertia phase has not been yet initiated, the requirement for cancelling the rotation synchronization control is output while the normal shift control is carried out. For example, the normal shift control in case that the target gear NextGP is changed from the 3rd gear to the 4th gear is to carry out the power-off downshift of from the $5^{th}$ gear to the 4th gear (i.e., the control for raising the engine speed under the action of the engaging-side engaging element).

[Regarding the Control for Cancelling Rotation Synchronization Control]

Figure 9:
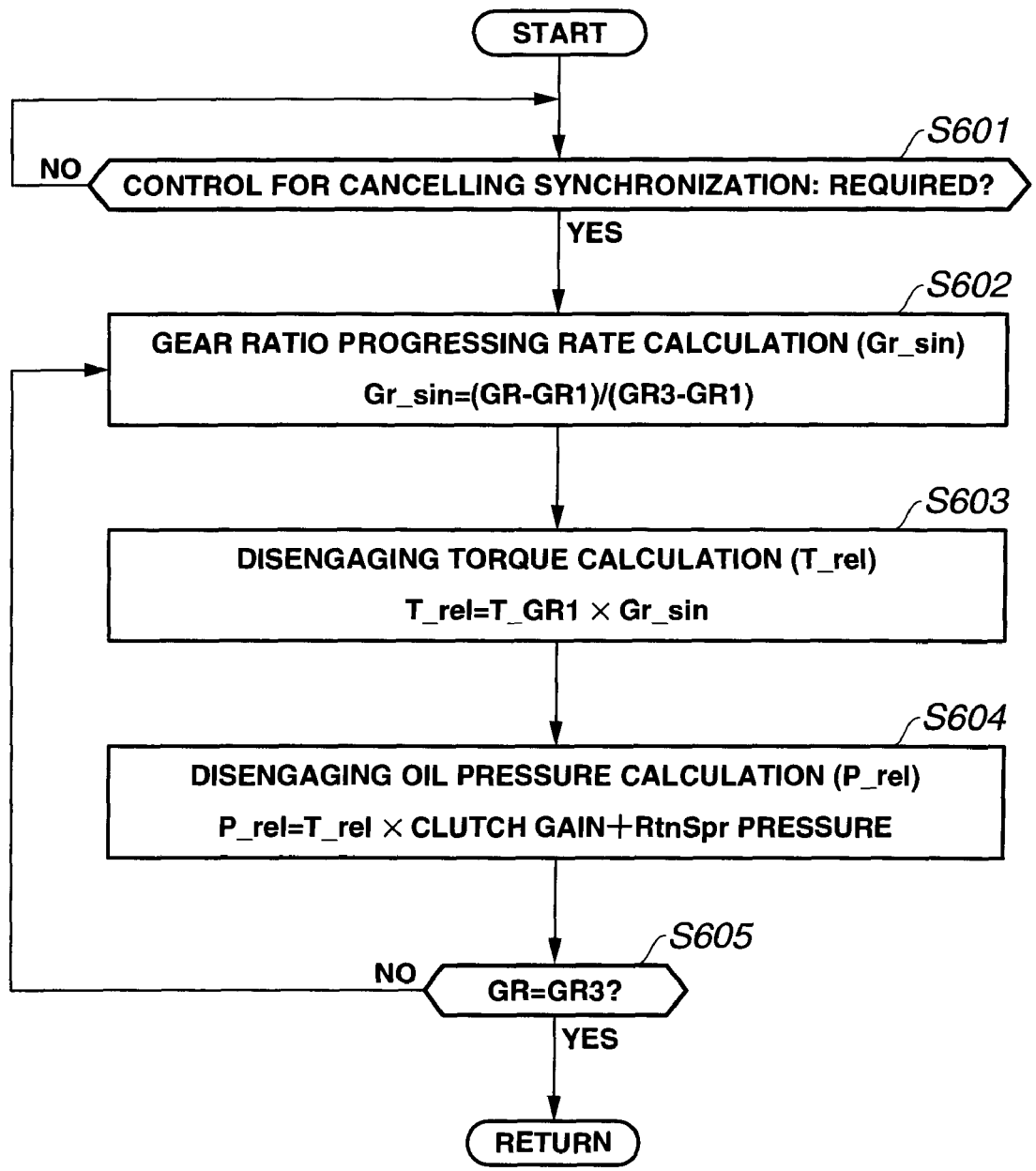
FIG. 9 is a flowchart showing a control for cancelling the rotation synchronization control, carried out by the control system of FIG. 1.

Next, the rotation synchronization control cancelling control will be discussed. FIG. 9 is a flowchart showing the content of the rotation synchronization control cancelling control.

At a step S601, a decision is made as to whether or not a requirement of the rotation synchronization control cancelling control is output. When the requirement is output, a processing goes to a step S602. When the requirement is not output, this step is repeated.

At a step S602, a gear ratio progressing rate is calculated according to the following equation:

$$Gr\_sin = (GR - GR1)/(GR3 - GR1)$$

At a step S603, a disengaging torque T_rel is calculated according to the following equation:

$$T\_rel = T\_GR1 \times Gr\_sin$$

where T_GR1 indicates a torque representing the engaging capacity of the disengaging-side engaging element at a time point at which the inertia phase is initiated, i.e., a torque transmitted to the output shaft. This T_GR1 may be a preset value or suitably set based on the accelerator pedal depression degree or the like.

At a step S604, a disengaging oil pressure P_rel is calculated according to the following equation:

$$P\_rel = T\_rel \times \text{clutch gain} + \text{RtnSpr pressure}$$

where the clutch gain represents a gain for changing the torque to an oil pressure of the engaging element; and the RtnSpr pressure represents an oil pressure against the force of a return spring provided in the engaging element. Specifically, although the disengaging control itself is carried out according to the flowchart of FIG. 5, a value obtained by subtracting the above disengaging oil pressure P_rel from the oil pressure calculated in the flowchart of FIG. 5 is output.

At a step S605, a decision is made as to whether or not the gear ratio GR reaches the certain gear ratio GR3 representing the termination of the inertia phase. When the decision result of reaching is made, the flow of this control is terminated. When the decision result of not-reaching is made, the flow returns to the step S602 thereby repeating this control. By this, when the power-off condition has been established, the operating oil pressure of the disengaging-side engaging element is set at a level according to the progressing condition of the inertia phase.

Next, reasons for employing the rotation synchronization control cancelling control will be discussed. In case that the accelerator pedal is returned to establish the power-off condition during the execution of the power-on downshift, it is assumed that the target gear NextGP decided with reference to the shift schedule is changed to the side of the upshift. However, the operator may often require the deceleration, so that it is preferable to continue the downshift from the viewpoint of positively using the engine brake.

Accordingly, it will be thought out to continue the downshift in such an operating condition. However, if the rotation synchronization control of the engine is continued in a condition where the disengaging-side engaging element has the engaging capacity like in the control system for the automatic transmission as discussed in Japanese Patent Provisional Publication No. 3-194256, the positive torque is output from the side of the engine so that the positive torque is transmitted to the driving wheels thereby generating an acceleration feeling, thus making a fear of providing an unreasonable feeling to the operator.

Accordingly, when the power-off condition is detected, the following control is thought out to be taken: The control of the output of the engine is changed to a control (hereinafter referred to as a torque control) in which the engine output is according to the accelerator pedal depression degree, while the disengaging-side engaging element and the engaging-side engaging element are respectively put into the disengaging state and the engaging state so as to cause the engine speed to reach a rotation synchronization engine speed (or the target engine speed in the rotation synchronization control in FIG. 6), thereby raising the engine speed to carry out the downshift. In this case, no positive torque is transmitted from the engine side (the engine does not develop such a torque as to raise the engine speed since the accelerator pedal is returned), thus preventing an acceleration feeling from being provided to the operator.

However, in this control, it is required to make a changeover from an engaging capacity control for the disengaging-side engaging element to an engaging capacity control for the engaging-side engaging element in the control of the engaging elements. In this regard, a shift shock will occur if changeovers are made at accurately suitable timings on the engine torque, the disengaging state of the disengaging-side engaging element and the engaging state of the engaging-side engaging element (i.e., three factors); however, the control itself will be complicated if the above three factors are changed over at the accurately suitable timings.

In view of the above, in the first embodiment of the present invention, the engaging capacity of the disengaging-side engaging element is lowered thereby continuing the downshift when the power-off condition is detected, while the rotation synchronization of the engine is continued.

By this, even when the accelerator pedal is returned to establish the power-off condition during the execution of the downshift upon depression of the accelerator pedal, for example, even when the target gear (shift gear stage) represents an upshift on the shift schedule, the downshift which is currently progressing is continued and therefore an engine brake can be obtained after the downshift.

Additionally, by lowering the engaging capacity of the disengaging-side engaging element given during the execution of the downshift when the power-off condition is detected, the engine torque is difficult to be transmitted to the side of the driving wheels thereby suppressing an unreasonable feeling provided to the driver.

Further, it is not required to change the engine torque and change over the controls of the disengaging-side engaging element and the engaging-side engaging element, thereby preventing the control from becoming complicated thus suppressing the shift shock.

Further, by lowering the engaging capacity of the disengaging-side engaging element, the load of the engine is lowered so that the engine speed tends to readily rise and therefore the engine speed can readily rise to the target engine speed thereby shortening a shift time.

Here, it is a subject how to lower the engaging capacity of the disengaging-side engaging element. For example, it will be thought out to lower the oil pressure at the disengaging-side engaging element to the lowest level (or zero oil pressure) in a step-like manner when the power-off condition is detected under releasing a foot from the accelerator pedal. However, when the power-off condition is detected, the disengaging-side engaging element cannot be obtained a sufficient engaging capacity, or the piston of the engaging-side engaging element is in a state where the piston stroke has not been completed, depending on some progressing conditions of the shift control (particularly at the initiation period of the shift). If the disengaging-side engaging element is disengaged at a stretch in such a condition, the oil pressure of the engaging-side engaging element cannot be accurately controlled, so that there arises the fear of inviting a shift shock though the rotation synchronization control is carried out on the side of the engine.

Additionally, on the side of the engine, at the initial period of the shift, the engine speed is rising toward the target engine speed outputting a relatively large torque. When the load suddenly decreases while the engine is outputting a large torque, the engine speed rapidly increases so that the engine speed cannot be effectively converged into the target engine speed thereby providing the fear of causing a racing over the target engine speed. Additionally, if the disengaging-side engaging element is disengaged by lowering its oil pressure to zero in a step-like manner, the torque transmitted to the output shaft is also lowered at a stretch thereby causing a rapid reduction in acceleration feeling (or so-called gravity-disappearing feeling), which may provide an unreasonable feeling to the operator.

Otherwise, it is thought out to lower the oil pressure with a certain inclination from a time point at which the power-off condition is detected. However, depending on some progressing conditions of the shift control (particularly near the termination of the shift), a time is required to lower the oil pressure at the disengaging-side engaging element regardless of a condition where the engaging capacity of the engaging-side engaging element is ensured, the rotation synchronization control on the engine side is near its termination, and the engine torque is lowered. Accordingly, the time required until the termination of the shift is unavoidably prolonged, and the time required for transmitting the torque to the output shaft is unavoidably prolonged, thereby making the fear of providing an unreasonable feeling to the operator.

In view of the above, in the first embodiment, a lowering amount of the engaging capacity of the disengaging-side engaging member is set according to the progressing degree of the progressing condition (or progression) of the shift. Specifically, when the shift is at the initial period of the progressing condition, the lowering amount of the engaging capacity is set at a smaller value. When the shift is at the terminal period of the progressing condition, the lowering amount of the engaging capacity is set at a larger value. Since the lowering amount of the engaging capacity is lowered according to the progressing condition of the shift after being lowered, the time required for transmitting the torque to the output shaft can be prevented from being prolonged while avoiding occurrence of the shift shock due to the disengagement at a stretch, occurrence of the engine racing and giving the gravity-disappearing feeling, thus suppressing generation of an operator's unreasonable feeling.

Figure 10:
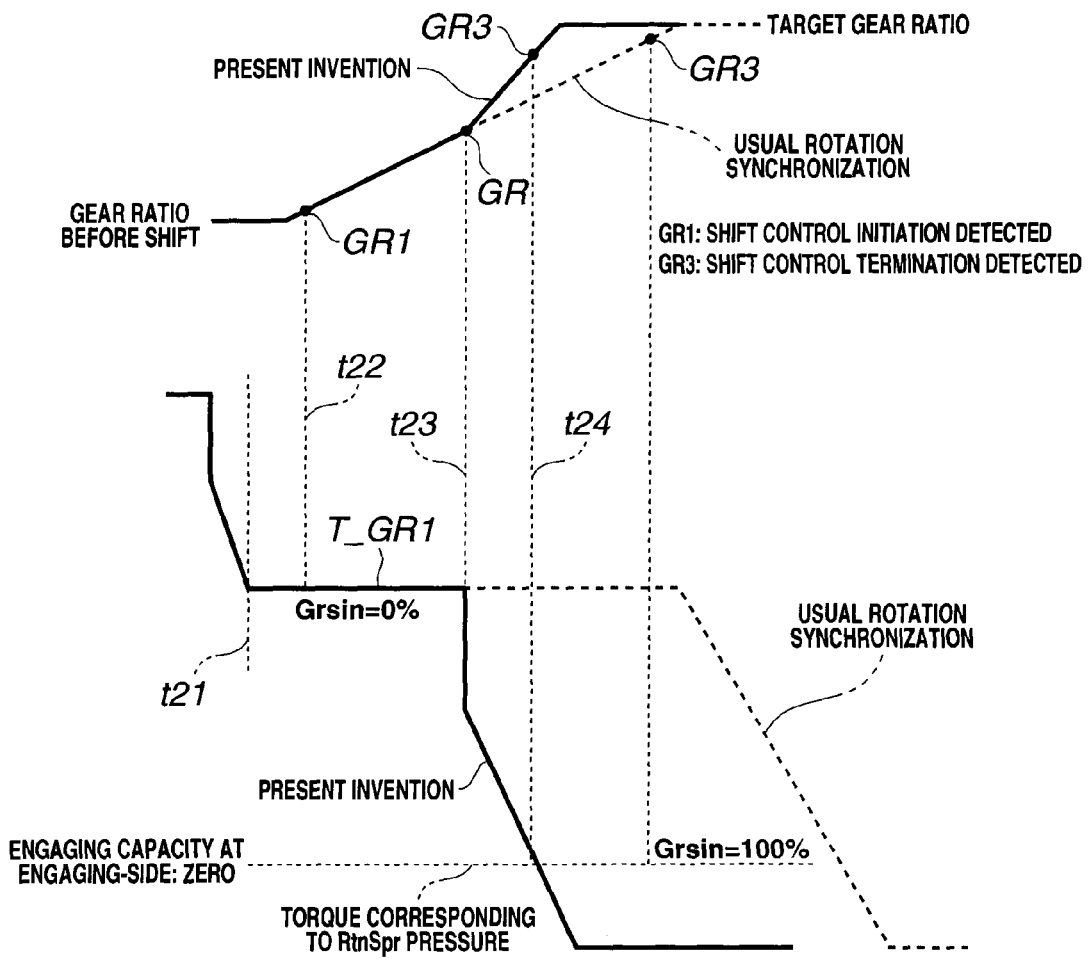
FIG. 10 is a time chart showing the rotation synchronization control cancelling control of FIG. 9, carried out by the control system of FIG. 1.

FIG. 10 is a time chart obtained when the rotation synchronization control cancelling control is carried out. At a time t21 after the power-on downshift is initiated, an engaging capacity T_GR1 is set at the disengaging-side engaging element under the constant pressure supply control.

At a time t22, when the inertia phase is initiated under the rotation synchronization control, the gear ratio GR changes with a certain inclination. When the operator's foot is released from the accelerator pedal at a time t23 during the inertia phase, the execution of the rotation synchronization control cancelling control is required.

Here, in case that the normal rotation synchronization control is continued, the engine speed must be raised to the target engine speed under a condition where the engaging capacity at the disengaging-side engaging element is left, and therefore a time is required for accomplishing the downshift while the torque is unavoidably continued to be output to the output shaft thereby providing an unreasonable feeling to the operator.

Against the above, in the first embodiment, the torque is lowered at a stretch by a disengaging torque amount according to the progressing degree of the shift. Thereafter, the disengaging torque is gradually increased according to the progression of the shift. At a time t24, when the gear ratio GR reaches the certain gear ratio GR3 representing the termination of the inertia phase, the torque capacity of the engaging element becomes zero.

Since the engaging capacity is not lowered to zero in a step-like manner with releasing the operator's foot from the accelerator pedal, the shift shock, the engine racing and the gravity-disappearing feeling can be prevented from being occurrence. Additionally, by making zero the engaging capacity of the disengaging-side engaging element for a short time from the time of releasing the foot from the accelerator pedal, a time for transmitting the torque to the output shaft is shortened thereby suppressing the operator's unreasonable feeling.

As discussed above, in the first embodiment, advantageous effects discussed below can be attained.

(1) The control system for the automatic transmission is configured as follows: When the power-on downshift is carried out, first a constant pressure (a first engaging capacity) is provided to the disengaging-side engaging element while the engaging-side engaging element is put into the disengaging state, and the engine speed is maintained at a level according to the gear (NextGP or SftGP) to be obtained after the downshift under the rotation synchronization control (by an engine control section). Secondly, when a parameter representing the progressing condition of the downshift reaches a certain value, an engaging capacity of the engaging-side engaging element is increased to engage the engaging-side engaging element, and an engaging capacity of the disengaging-side engaging element is decreased to disengage the disengaging-side engaging element.

In the above control system provided with the APO sensor 1 (or a detecting section) for detecting an operating amount of an accelerator pedal, when a power-off condition is detected upon an accelerator pedal being returned to a state representing a certain operating amount of the accelerator pedal during the power-on downshift (the step S401), the engaging capacity of the disengaging-side engaging element is decreased to an engaging capacity (or a second engaging capacity) smaller than the constant pressure (or the first engaging capacity) to continue the downshift which is currently progressing, and the rotation synchronization control is continued.

Accordingly, even if the accelerator pedal is returned during the execution of the downshift upon depression of the accelerator pedal, for example, even if the target gear (shift gear stage) is changed to an upshift-side, the downshift which is currently progressing is continued thereby obtaining an engine brake after the downshift. Additionally, by lowering the engaging capacity of the disengaging-side engaging element provided during the execution of the downshift, the engine torque is prevented from being transmitted to the side of the driving wheels, thereby suppressing an unreasonable feeling of the operator. Further, it is unnecessary to carry out changeovers for control of the engine and for control of the engaging elements and the like, thereby preventing the controls from being complicated thus suppressing the shift shock.

(2) The engaging capacity (or the second engaging capacity) of the disengaging-side engaging element is decreased to an engaging capacity (or the second engaging capacity) smaller than the constant pressure (or the first engaging capacity) as the downshift progresses at a time when the power-off condition is detected.

Accordingly, the shift shock, the engine racing and the gravity-disappearing feeling caused with complete disengagement of the engaging element in a step-like manner can be prevented while avoiding prolongation of a time for transmitting a torque to the output shaft, thereby effectively suppressing an unreasonable feeling of the operator.

The entire contents of Japanese Patent Application No. 2008-163563, filed Jun. 23, 2008, are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A control system for an automatic transmission in which a downshift is made by disengaging a disengaging-side engaging element and engaging an engaging-side engaging element, the control system comprising:
an engine control section configured to control an engine speed of an engine connected to the automatic transmission;
a downshift control section configured to provide a first engaging capacity to the disengaging-side engaging element and put the engaging-side engaging element in a disengaging state, to control the engine control section to maintain the engine speed at a level according to a gear of the automatic transmission to be obtained after the downshift, and to increase an engaging capacity of the engaging-side engaging element to engage the engaging-side engaging element and decrease the first engaging capacity of the disengaging-side engaging element to disengage the disengaging-side engaging element when a parameter representing a progressing condition of the downshift reaches a value, thereby carrying out the downshift in a power-on condition; and
a detecting section configured to detect an operating amount of an accelerator pedal,
wherein, when a power-off condition is detected upon the accelerator pedal being returned to a position representing an operating amount during the downshift, the downshift control section is configured to decrease the first engaging capacity of the disengaging-side engaging element to a second engaging capacity smaller than the first engaging capacity of the disengaging-side engaging element to continue the downshift which is currently progressing and to cause the engine control section to continue controlling the engine speed.

2. A control system as claimed in claim 1, wherein the second engaging capacity is smaller as the downshift progresses at a time when the power-off condition is detected.

3. A control system for an automatic transmission in which a downshift is made by disengaging a disengaging-side engaging element and engaging an engaging-side engaging element, the control system comprising:
an engine control unit configured to control an engine speed of an engine connected to the automatic transmission;
a detector configured to detect an operating amount of an accelerator pedal; and
a downshift control unit configured to:
provide output representing a first engaging capacity being provided to the disengaging-side engaging element and the engaging-side engaging element being put in a disengaging state,
provide output representing the engine control unit to maintain the engine speed at a level according to a gear of the automatic transmission to be obtained after the downshift,
provide output representing an engaging capacity of the engaging-side engaging element to increase to engage the engaging-side engaging element and the first engaging capacity of the disengaging-side engaging element to decrease to disengage the disengaging-side engaging element when a parameter representing a progressing condition of the downshift reaches a value, thereby carrying out the downshift in a power-on condition, and
provide, when a power-off condition is detected upon the accelerator pedal being returned to a position representing an operating amount during the downshift, output representing the first engaging capacity of the disengaging-side engaging element to decrease to a second engaging capacity smaller than the first engaging capacity of the disengaging-side engaging element so as to continue the downshift which is currently progressing and the engine control unit to continue controlling the engine speed.

4. A control system as claimed in claim 3, wherein the second engaging capacity is smaller as the downshift progresses at a time when the power-off condition is detected.

* * * * *